United States Patent [19]

Belcher

[11] Patent Number: 4,992,230

[45] Date of Patent: Feb. 12, 1991

[54] METHOD FOR MAKING A HOLLOW POLYETHYLENE TEREPHTHALATE BLOW MOLDED ARTICLE WITH AN INTEGRAL EXTERNAL PROJECTION SUCH AS A HANDLE

[75] Inventor: Samuel L. Belcher, Cincinnati, Ohio

[73] Assignee: Sabel Plastechs, Inc., Cincinnati, Ohio

[21] Appl. No.: 511,561

[22] Filed: Apr. 20, 1990

Related U.S. Application Data

[63] Continuation-in-part of Ser. No. 222,186, Jul. 21, 1988.

[51] Int. Cl.⁵ .................... B29C 45/14; B29C 49/20
[52] U.S. Cl. .................... 264/513; 264/515; 425/112; 425/129.1; 425/525
[58] Field of Search .......... 264/513, 515, 535, 537, 264/540, 250, 259; 425/525, 112, 129.1, 532, 533

[56] References Cited

U.S. PATENT DOCUMENTS

| | | | |
|---|---|---|---|
| 4,659,531 | 4/1987 | Ezaki | 264/515 |
| 4,727,997 | 3/1988 | Nakamura | 215/100 A |

FOREIGN PATENT DOCUMENTS

| | | | |
|---|---|---|---|
| 3439285 | 8/1985 | Fed. Rep. of Germany | 264/513 |
| 3443715 | 6/1986 | Fed. Rep. of Germany | 264/513 |
| 52-33662 | 8/1977 | Japan | 264/513 |
| 59-199214 | 11/1984 | Japan | 264/513 |
| 60-147319 | 8/1985 | Japan | . |
| 63-022621 | 1/1986 | Japan | 425/525 |
| 1122516 | 8/1968 | United Kingdom | 264/513 |

Primary Examiner—Jan H. Silbaugh
Assistant Examiner—Catherine Timm
Attorney, Agent, or Firm—Wood, Herron & Evans

[57] ABSTRACT

A method and apparatus for making a hollow blow molded article with an integral external projection such as a handle thereon. The method includes blow molding the hollow article and then injection molding the integral projection thereon. The apparatus includes a combination mold having separate and independent blow mold and injection mold cavities which communicate at an interface therebetween. In a preferred embodiment, the blow molded article with integral handle is polyethylene terephthalate (PET).

4 Claims, 3 Drawing Sheets

METHOD FOR MAKING A HOLLOW POLYETHYLENE TEREPHTHALATE BLOW MOLDED ARTICLE WITH AN INTEGRAL EXTERNAL PROJECTION SUCH AS A HANDLE

This application is a continuation-in-part of pending application Ser. No. 07/222,186, filed July 21, 1988.

FIELD OF THE INVENTION

The present invention is directed to a method and apparatus for making a hollow article having an integral projection extending from a wall thereof, such as, a bottle with an integral handle thereon, in which both the hollow article and integral projection are fabricated of a tough clear plastic which serves as a good substitute for glass containers used in the beverage and food industry, said plastics including polyethylene terephthalate (PET), and other suitable thermoplastic materials, such as, Eastman Developmental 5X0 polyester, Rohm and Haas Kamax resins, and Goodyear CLEAR-TUF HP high performance polyester.

BACKGROUND OF THE INVENTION

There is a continuous demand, particularly in the food and beverage industry, for articles, such as bottles, buckets, pitchers, funnels, etc., made of clear, tough plastic because they are relatively inexpensive, easy to use, generally non-breakable and serve as a good substitute for glass. It is often-times desirable that such articles have handles thereon to aid in their use, particularly when of large size. U.S. Pat. No. 4,713,207 discloses a method of making a plastic container with an integral handle member thereon. The method disclosed includes the step of extruding a thermoplastic parison between sections of a mold and then blowing the container. Since it is generally understood that PET does not have sufficient hot melt strength to be extrusion blow molded, however, other thermoplastic materials, such as high density polyethylene and polyvinyl chloride, must be used to produce blow molded containers where the handle is integral with the container.

When PET is used and handles are desired, it has been the practice to attach the handle to the PET article in a separate operation, such as by ultrasonic fusion, after the blow molded PET article has been formed in and removed from the blow mold. U.S. Pat. No. 4,727,997 discloses a method and apparatus for producing a PET bottle with a PET handle. In a first step, a parison is blow molded in a blow mold which has inwardly extending circumferential ridges to produce a blown bottle with article-encircling grooves therein. In a second step, the blow molded bottle is transferred to a second mold, a grip molding mold, which has circumferential grooves therein, and a handle is injection molded and attached to the bottle by way of circumferential connecting rings seated in the circumferential grooves in the bottle.

Another approach has been to injection mold a thermoplastic handle in an operation separate and apart from the blow molding of the container, and snap the separately molded handle over the neck or finish of the blown PET bottle. In accordance with a still further proposal, the separately molded handle is inserted in the blow mold and the bottle is blown over/into the handle.

Still another approach is disclosed in the German No. 3,443,715 and Japanese No. 52-33662 references. The schemes disclosed therein are directed to apparatus including an injection mold cavity that communicates with a blow mold cavity, and movable injection mold-defining members that move within the blow mold. The movable injection mold-defining members cover the portion of the injection mold that communicates with the blow mold while the projections are injection molded. Subsequently, the movable members are retracted or removed from the blow mold and the hollow article is blow molded against the previously-formed injection molded projection.

A further known scheme is described in the Japanese No. 60-147319 reference. This approach, which is not actually directed to forming an injection molded handle on a blow molded article, discloses injecting molten material into the corners of a blow mold cavity to fill in the corners of a blow molded article. The apparatus has a single mold cavity—a blow mold cavity.

None of the above practices, however, has been entirely satisfactory since they add steps to the fabrication process, utilize complicated molds with moving parts therein, may require ultrasonic bonding equipment or multiple separate molds, and are otherwise unduly time-consuming and expensive.

SUMMARY OF THE INVENTION

The present invention is directed to a method and apparatus for making articles of a tough clear plastic having integral external projections, such as handles and/or feet, which serve as a good substitute for glass containers, particularly for the food and beverage industry, and more particularly to a method and apparatus for making a blow molded article, for instance, a bottle, with an integral projection, such as a handle or foot, extending from a wall thereof, of polyethylene terephthalate (PET) or other suitable material such as Eastman Developmental 5X0 polyester, Rohm and Haas Kamax resins and Goodyear CLEARTUF HP high performance polyester. Since both the bottle and handle or foot are made of PET, or other suitable material, they both possess the superior characteristics of these materials and recycling is facilitated.

A preferred embodiment of the apparatus of the present invention includes a combination blow mold and injection mold having a hollow article-defining blow mold cavity and a projection-defining injection mold cavity which are physically separate and independent of each other except for communicating at an interface therebetween. The hollow article-defining blow mold cavity has an interior wall surface which defines and corresponds to the entire desired shape of the exterior surface of the hollow article to be blow molded therein, other than at the interface with the injection mold cavity. The blow mold is free of relatively movable injection cavity-defining parts which move within the blow mold relative to the injection mold cavity. Additionally, the blow mold cavity interior wall surface is free of inwardly projecting ridges which extend around substantially the entire circumference thereof and are in communication with the injection mold cavity at the interface between the injection mold and blow mold cavities. The projection-defining injection mold cavity, which is physically separate and independent of the blow mold cavity except where they communicate at their interface, defines the projection extending from the exterior wall section of the article and the interface whereat the blow mold and injection mold cavities are in communication with each other corresponds to the location on the article wall from which the projection extends.

The apparatus of the invention further includes means for opening and closing the combination mold; means for inserting a preform or introducing a tube of extruded thermoplastic material into the blow mold cavity of the combination mold; means for injecting blow gas when the combination mold is closed to conform the preform or extruded tube to the blow mold cavity; and means for injecting molten thermoplastic into the injection mold cavity preferably substantially immediately subsequent to the blow molding operation to form an integral injection molded projection bonded to the wall of the hollow blow molded article at the interface whereat the injection mold cavity communicates with the blow mold cavity.

The apparatus is a machine for completely forming, in a single stage, a hollow blow molded article having an integral injection molded projection bonded to and extending from an exterior wall section thereof. The machine is free of a blow mold which is not in communication with an injection mold via an interface between their respective cavities. That is, since the apparatus is a single-stage apparatus, it requires only one mold configured in the shape of the hollow article, rather than multiple hollow article-configured molds, as does the apparatus disclosed in U.S. Pat. No. 4,727,997. The apparatus of this invention also eliminates the need for movable injection mold-defining members located within a blow mold, as does the apparatus of German No. 3,443,715 and Japanese No. 52-33662.

In the method of this invention, which is carried out in the above-described apparatus, a PET preform (or other suitable thermoplastic material) is inserted into the physically separate and independent blow mold cavity of the combination blow mold and injection mold wherein the blow mold cavity defines the article to be blown and the injection mold cavity defines the projection bonded to and extending from the blown article at the point where the blow mold and injection mold cavities interface. As noted, the injection mold cavity and the blow mold cavity, while physically separate and independent, are in communication with each other at at least one location (interface) defining the area where the handle or foot is bonded to and extends from the container. The "preform" may be a coextruded, co-injected, or straight injection molded or fabricated PET preform.

After insertion into the combination mold, the preform is injected with blow gas from a gas nozzle to conform the preform to the blow mold cavity, thereby forming the hollow blow molded article. Prior to blowing the preform in the blow mold cavity, the preform temperature is established at the desired level. For example, if PET is used, the preform temperature is established at its stretch orientation temperature, which is well known for PET to be in the range of about 195° F. to about 240° F. The preform may be one previously made on another machine which is heated to the stretch orient temperature range in a separate heating operation prior to insertion in the blow mold, or it may be a previously injection molded PET preform (as on a single-stage PET machine) that has cooled to the appropriate stretch orientation temperature immediately prior to insertion in the blow mold cavity.

Substantially immediately subsequent to blow molding, while the pressure of the blow gas holds the preform in conformity with the blow mold cavity, and prior to exhausting the blow gas, molten PET is injected under pressure into the injection mold cavity to form the integral protrusion or handle and bond it to the blown preform article at the interface whereat the injection mold cavity communicates with the blow mold cavity. The combination mold is then opened and the finished article is removed. Because the handle and container in the preferred embodiment of the method described are both PET, and the injected PET is molten when injected into the injection mold cavity, the injection molded projection, or handle, fuses to the hollow blown article without need for ultrasonic bonding, adhesive, snap-on fittings, container encircling rings, or the like.

It will be appreciated that various thermoplastic materials other than PET may be advantageously employed, either singly or in various combinations, in carrying out the method of the present invention, to produce blow molded articles having integral injection molded projections or handles bonded thereto. When a multi-layer preform is used, which is produced by coextrusion or coinjection of multiple layers of different materials, it is imperative that there be at least one layer which possess the requisite barrier, orientation, temperature resistance and clarity properties for the desired final article. For example, it may be desirable to use a coextrusion of PET and polycarbonate, since polycarbonate has high strength and temperature resistance properties, but poor barrier properties, and PET has desirable barrier properties.

Other materials which may be directly substituted and/or combined with PET to form articles using the method and apparatus of the present invention are: Eastman Developmental 5X0 polyester, Rohm and Haas Kamax resins, and Goodyear CLEARTUF HP high performance polyester. The Eastman Developmental 5X0 polyester is biaxially orientable and will provide a clear article when blow molded that has approximately five times the barrier resistance to oxygen as PET. In addition, the 5X0 does not require heat setting and can be hot-filled at temperatures of between about 210° F.–220° F. The 5X0, available from Eastman Chemical Co., Kingsport, Tenn., is a polyester polymer which has an amorphous density of about 1.329 (g/cc), a crystalline density of about 1.360 (g/cc), a number average molecular weight ($M_n$) of about 23,000, and a weight average molecular weight ($M_w$) of about 52,000.

The resins sold under the trademark Kamax (T-150, T-170, T-240 and T-260) by Rohm and Haas are also suitable for use in place of or in combination with PET. The Kamax resins, which are imidized acrylics, are typically quite brittle, but possess desirable strength properties once they have been biaxially oriented. Kamax resins have good temperature resistance, with their glass transition temperature (Tg) being at or about 300° F., or higher. The oxygen barrier resistance of Kamax resins is about twice that of PET and it forms a clear article when blow molded.

The Goodyear high performance polyester, CLEARTUF HP, has a barrier resistance to oxygen of approximately five times that of PET and a Tg of about 250° F., which obviates the need for heat setting when hot-filling at between about 210° F.–220° F. CLEARTUF HP is biaxially orientable and forms a clear article when blow molded. Furthermore, CLEARTUF HP has a metling point of about 538° F., which results in higher temperature resistance than PET.

DETAILED DESCRIPTION OF THE INVENTION

Figure 1:
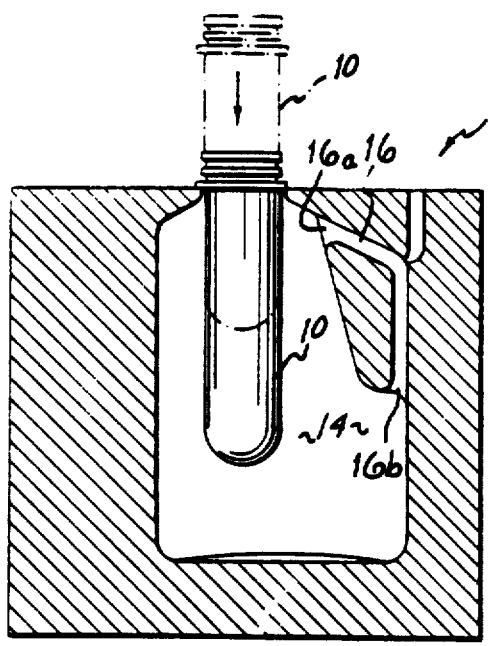
FIG. 1 is a cross sectional view of the combination blow mold and injection mold with a preform (shown partially in phantom) being inserted therein.

FIG. 1 shows a preform 10 (partially in phantom) being inserted into blow mold cavity 14 of combination blow mold and injection mold 12. Combination mold 12 consists of a hollow article-defining blow mold cavity 14, the interior wall surface of which defines and corresponds to the entire desired shape of the exterior surface of the hollow article body 31 (shown in FIG. 4) and a projection-defining injection mold cavity 16 conforming to the desired shape of the projection or handle 32. Blow mold cavity 14 and injection mold cavity 16 are physically separate and independent of each other except for communicating at an interface therebetween. The blow mold cavity fully shapes the blow molded article, and the injection mold fully shapes the injection molded projection, such as the foot or handle.

Figure 4:
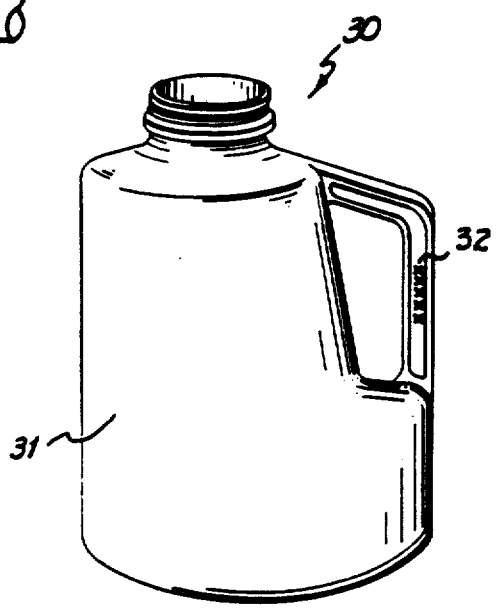
FIG. 4 shows a finished blow molded bottle with an integral injection molded handle.

One embodiment of the container produced using the apparatus of the present invention is shown in FIG. 4. As can be seen, the container has a smooth exterior surface around the entire periphery, free of grooves which surround substantially the entire circumference of the container in the region where the handle connects to the container. Additionally, it is clear that the article is free of circumferential rings connecting the handle to the container.

Blow mold 14 is free of relatively movable injection cavity-defining parts which move within blow mold 14 relative to injection mold cavity 16. Blow mold cavity 14 interior wall surface is free of inwardly projecting ridges which extend around substantially the entire circumference of the blow mold cavity. The blow mold cavity 14 shown in FIG. 1 constitutes the rear one-half section which defines the rear of the container. The front one-half section of the mold (not shown), which defines the front section of the container, is identical to the rear section of the mold.

Injection mold cavity 16 communicates at upper and lower ends 16a and 16b with the interior of the blow mold cavity 14 at the interfaces whereat the projection extends from the wall of the hollow article. Preform 10 may be formed by one of a number of known techniques such as are disclosed in U.S. Pat. Nos. 4,151,250, 4,153,667, and 3,781,395. The preform is either heated to the appropriate stretch orientation temperature of between about 195° F. and 240° F. (for PET) prior to insertion in the mold, utilizing conventional techniques well known in the blow molding art, or it may reach the appropriate stretch orientation temperature by cooling after being injection molded on a single stage PET machine. It will be appreciated that preform 10 need not be of the shape shown in FIG. 1 and that suitable materials other than PET, as disclosed herein, may be used.

Figure 2:
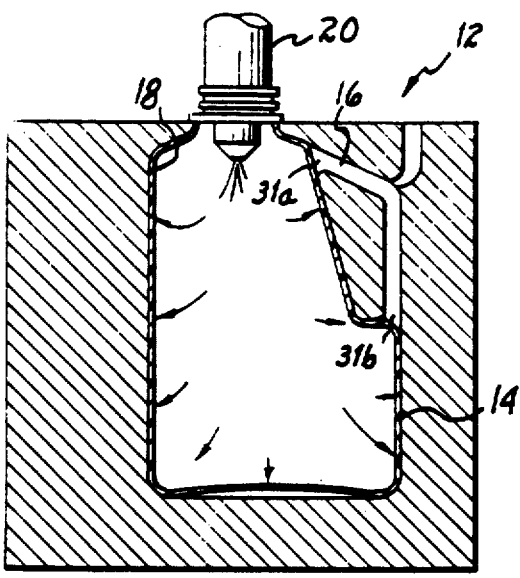
FIG. 2 shows the preform being expanded by blow gas to conform to the blow mold cavity.

Once preform 10 has been inserted into blow mold cavity 14 and combination mold 12 has been closed therearound, by any suitable means known in the art, blow gas injection means (shown generally as 20 in FIG. 2) is inserted into and injects blow gas into preform 10 such that preform 10 conforms to the shape of blow mold cavity 14 (also shown in FIG. 2). The blow gas is injected at a pressure of between about 100 psi and about 750 psi and at a temperature of between about 40° F. and about 120° F. At this point the exterior wall of article 31 communicates with the ends 16a and 16b of the injection mold cavity 16 at points 31a and 31b.

Figure 3:
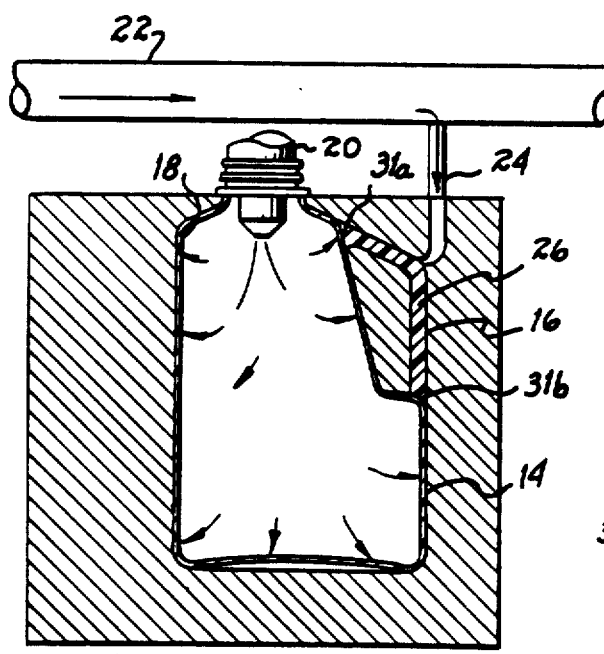
FIG. 3 shows the injection molding of the integral handle while pressure holds the article against the blow mold wall.

In FIG. 3 there is shown a PET injection melt stream 22 which carries molten PET flowing in the direction of the arrow. The molten PET, which is at a temperature above 485° F., is injected through injection nozzle means (shown generally as 24) into injection mold cavity 16 while blown preform 18 is conformed to blow mold cavity 14 by the blow gas and preferably substantially immediately subsequent to the blow molding step. In this way, the injection molded handle 26 directly fuses or bonds to blown PET article 18 at points 31a and 31b proximate injection mold cavity ends 16a and 16b, which correspond to the interfaces whereat blow mold cavity 14 and injection mold cavity 16 communicate. Standard injection molding apparatus and procedures, which are well known in the art for producing PET preforms, are used in the injection molding step of this invention.

FIG. 4 shows a finished blow molded bottle with an integral injection molded handle 30. As will be appreciated, since the handle or projection is injection molded, it may have any suitable cross-section, including cored, and may be of any suitable size. In addition, if desired, a name or identification symbol can be molded into the injection molded handle as indicated at 32 by including such name or symbol in the injection mold cavity 16. Furthermore, since the handle is injection molded it may be made from recycled or regrind PET. Finally, the handle may be clear or colored or crystallized.

Figure 5:
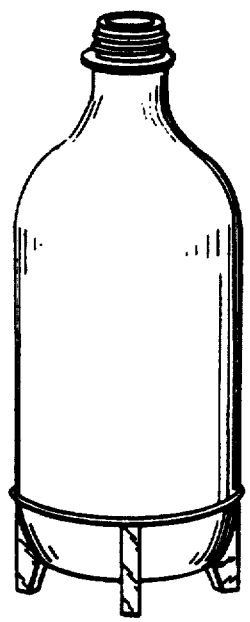
FIG. 5 shows a finished blow molded bottle with integral injection molded feet bonded thereto.
Figure 6:
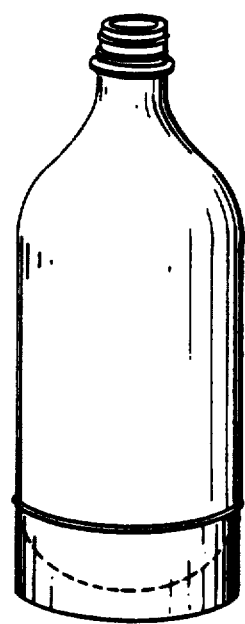
FIG. 6 shows a finished blow molded bottle with an integral injection molded base cup bonded thereto.

It will be appreciated by those skilled in the art that the method and apparatus of the present invention is adaptable to produce a wide variety of PET articles with integral PET projections thereon, one example of which is a blow molded bottle with an integral handle connected to that bottle at two points as is shown in FIGS. 1–4. Other products include, but are not limited to, funnels, buckets, pitchers, cylinders, etc. Any of the above articles may have a handle attached at two points (as shown in the FIGS.) or at one point so that it functions as a hook, or they may have a base structure or feet injection molded thereon. An example of a blow molded container having an injection molded foot is shown in FIG. 5 and an example of a blow molded container having an injection molded base structure is shown in FIG. 6. The projection can be attached to the article in a variety of positions, such as the bottom, side, or upper end. For example, a handle on the bottom of a bottle can be provided to facilitate hanging the bottle upside down for drainage or other purposes. In addition, multiple feet can be injection molded onto the lower end of the blow molded article using the method of this invention to provide a stable base or support. It will be further appreciated that the integral projection or handle can be attached to the blown article at any location, whether the wall thickness is relatively thick or thin.

Figure 7:
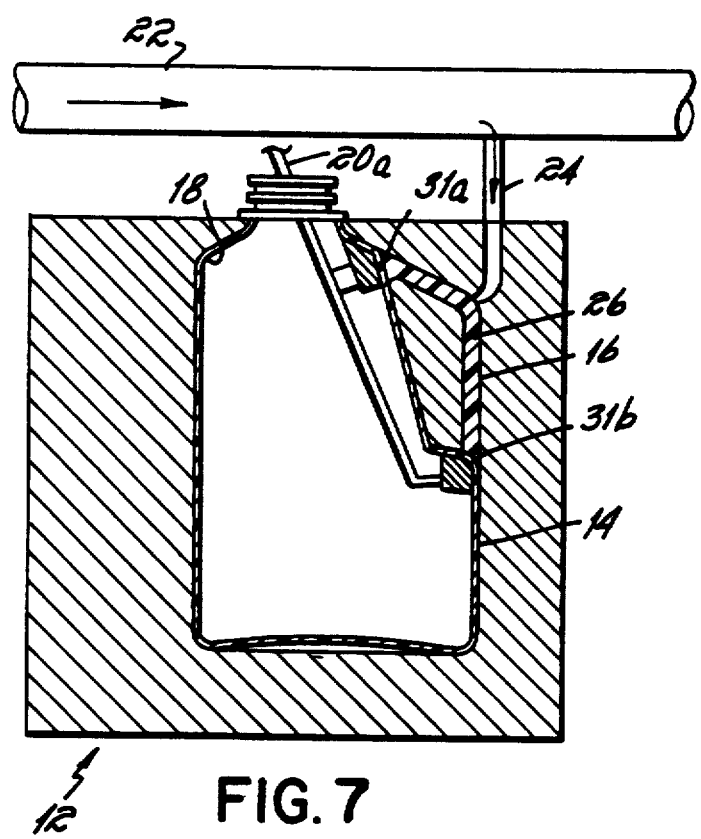
FIG. 7 shows a blow molded article in the blow mold cavity with an interiorly supporting mandrel inserted therein.

FIG. 7 shows a mandrel 20a inserted into the interior of blown preform 18 to provide support for the side wall of the container at the location where the handle is attached during the injection molding step.

The preferred embodiment of the method and apparatus of this invention has been described in connection with bonding a PET handle to the outside wall of a blow molded PET container by injecting the handle onto and/or against the outside wall of the blow molded container while the blow molded container is still in the mold and the blow gas pressure is still applied. It will be appreciated that other suitable thermoplastic materials can be employed to produce the desired articles. Additionally, it should be appreciated that the apparatus of the present invention is directed to a machine for forming, in a single stage, a hollow blow molded article with an integral injection molded projection bonded to and extending from an exterior wall section thereof, without intermediate removal of the article from a mold. The machine is free of a blow mold which is not in communication with an injection mold via an interface between their respective cavities.

While the invention has been described in detail with respect to a preferred embodiment thereof, it will be understood by those skilled in the art to which the invention pertains that numerous changes may be made in the invention without departing from the spirit and scope thereof.

What is claimed is:

1. A method of completely forming from a preform of polyethylene terephthalate and molten polyethylene terephthalate, in a combination mold and in a single stage without intermediate removal of the molded article from a mold, a hollow blow molded article of polyethylene terephthalate having an integral injection molded polyethylene terephthalate projection bonded to and extending from an exterior wall section thereof which is free of injection molded rings encircling the article and passing through the point where the projection bonds to the exterior wall section thereof, comprising the steps of:

(a) inserting an unblown preform of polyethylene terephthalate into the blow mold cavity of a combination blow mold and injection mold having a hollow article-defining blow mold cavity and a projection-defining injection mold cavity which are physically separate and independent of each other except for communicating at an interface therebetween, wherein the hollow article-defining blow mold cavity has an interior wall surface which defines and corresponds to the entire desired shape of the exterior surface of the hollow article other than at said interface whereat the projection is to be bonded to the exterior wall section of the article, the blow mold being free of relatively movable injection cavity-defining parts which move within the blow mold relative to said injection mold cavity to seal the blow mold and injection mold cavities at the interface, the projection-defining injection mold cavity defines the projection extending from said exterior wall section of the article, and the interface whereat the blow mold and injection mold cavities are in communication with each other corresponding to the location on the article wall from which the projection extends;

(b) closing the combination mold;

(c) injecting blow gas into the interior of said preform when the combination mold is closed and while said preform is at a temperature in the PET stretch orientation temperature range to conform said preform to the blow mold cavity and produce said article;

(d) injecting molten polyethylene terephthalate into the injection mold cavity after conforming the preform to the blow mold cavity with blow gas and prior to opening the combination mold and exhausting the blow gas and removal of said article from said combination mold, to form an integral injection molded projection bonded to said wall of the hollow blow molded article at the interface whereat the injection mold cavity communicates with the blow mold cavity;

(e) opening the combination mold; and (f) removing the hollow blow molded article with integral injection molded projection from the combination mold.

2. A method of completely forming from extruded polyethylene terephthalate and molten polyethylene terephthalate, in a combination mold and in a single stage without intermediate removal of the molded article from a mold, a hollow blow molded article of polyethylene terephthalate having an integral injection molded polyethylene terephthalate projection bonded to and extending from an exterior wall section thereof which is free of injection molded rings encircling the article and passing through the point where the projection bonds to the exterior wall section thereof, comprising:

(a) introducing extruded polyethylene terephthalate in substantially tubular form into the blow mold cavity of a combination blow mold and injection mold having a hollow article-defining blow mold cavity and a projection-defining injection mold cavity which are physically separate and independent of each other except for communicating at an interface therebetween, wherein the hollow article-defining blow mold cavity has an interior wall surface which defines and corresponds to the entire desired shape of the exterior surface of the hollow article other than at said interface whereat the projection is to be bonded to the exterior wall section of the article, the blow mold being free of relatively movable injection cavity-defining parts which move within the blow mold relative to said injection mold cavity to seal the blow mold and injection mold cavities at the interface; the projection-defining injection mold cavity defines the projection extending from said exterior wall section of the article, and the interface whereat the blow mold and injection mold cavities are in communication with each other corresponding to the location on the article wall from which the projection extends;

(b) closing the combination mold;

(c) injecting blow gas into the interior of the tubular polyethylene terephthalate when the combination mold is closed to conform the tube to said blow mold cavity and produce the article;

(d) injecting molten polyethylene terephthalate into the injection mold cavity after conforming the tubular polyethylene terephthalate to the blow mold cavity with blow gas and prior to opening the combination mold and exhausting the blow gas and removal of the article from the combination mold, to form an integral injection molded projection bonded to said wall of the hollow blow molded article at the interface whereat the injection mold cavity communicates with the blow mold cavity;

(e) opening the combination mold; and (f) removing the hollow blow molded article with integral injection molded projection from the combination mold.

3. A method of completely forming from a preform of thermoplastic material and molten thermoplastic material, in a combination mold and in a single stage without intermediate removal of the molded article from a mold, a hollow blow molded article of thermoplastic having an integral injection molded thermoplastic projection bonded to and extending from an exterior wall section thereof which is free of injection molded rings encircling the article and passing through the point where the projection bonds to the exterior wall section thereof, comprising the steps of:

(a) inserting an unblown preform of thermoplastic material into the blow mold cavity of a combination blow mold and injection mold having a hollow article-defining blow mold cavity and a projection-defining injection mold cavity which are physically separate and independent of each other except for communicating at an interface therebetween, wherein the hollow article-defining blow mold cavity has an interior wall surface which defines and corresponds to the entire desired shape of the exterior surface of the hollow article other than at said interface whereat the projection is to be bonded to the exterior wall section of the article, the blow mold being free of relatively movable injection cavity-defining parts which move within the blow mode relative to said injection mold cavity to seal the blow mold and injection mold cavities at the interface, the projection-defining injection mold cavity defines the projection extending from said exterior wall section of the article, and the interface whereat the blow mold and injection mold cavities are in communication with each other corresponding to the location on the article wall from which the projection extends;

(b) closing the combination mold;

(c) injecting blow gas into the interior of said preform when the combination mold is closed and while said preform is at a temperature in the stretch orientation temperature range thereof to conform said preform to the blow mold cavity and produce said article;

(d) injecting molten thermoplastic material into the injection mold cavity after conforming the preform to the blow mold cavity with blow gas and prior to opening the combination mold and exhausting the blow gas and removal of said article from said combination mold, to form an integral injection molded projection bonded to said wall of the hollow blow molded article at the interface whereat the injection mold cavity communicates with the blow mold cavity;

(e) opening the combination mold; and (f) removing the hollow blow molded article with integral injection molded projection from the combination mold.

4. A method of completely forming from extruded theremoplastic material and molten thermoplastic, in a combination mold and in a single stage without intermediate removal of the molded article form a mold, a hollow blow molded article of thermoplastic material having an integral injection molded thermoplastic projection bonded to and extending from an exterior wall section thereof which is free of injection molded rings encircling the article and passing through the point where the projection bonds to the exterior wall section thereof, comprising:

(a) introducing extruded thermoplastic material in substantially tubular form into the blow mold cavity of a combination blow mold and injection mold having a hollow article-defining blow mold cavity and a projection-defining injection mold cavity which are physically separate and independent of each other except for communicating at an interface therebetween, wherein the hollow article-defining blow mold cavity has an interior wall surface which defines and corresponds to the entire desired shape of the exterior surface of the hollow article other than at said interface whereat the projection is to be bonded to the exterior wall section of the article, the blow mold being free of relatively movable injection cavity-defining parts which move within the blow mold relative to said injection mold cavity to seal the blow mold and injection mold cavities at the interface, the projection-defining injection mold cavity defines the projection extending from said exterior wall section of the article, and the interface whereat the blow mold and injection mold cavities are in communication with each other corresponding to the location on the article wall from which the projection extends;

(b) closing the combination mold;

(c) injecting blow gas into the interior of the tubular thermoplastic when the combination mold is closed to conform the tube to said blow mold cavity and produce the article;

(d) injecting molten thermoplastic into the injection mold cavity after conforming the tubular thermoplastic to the blow mold cavity with blow gas and prior to opening the combination mold and exhausting the blow gas and removal of the article from the combination mold, to form an integral injection molded projection bonded to said wall of the hollow blow molded article at the interface whereat the injection mold cavity communicates with the blow mold cavity;

(e) opening the combination mold; and (f) removing the hollow blow molded article with integral injection molded projection from the combination mold.

* * * * *